United States Patent
Berke

(10) Patent No.: US 7,318,606 B1
(45) Date of Patent: Jan. 15, 2008

(54) LAP BELT COMFORT CUSHION

(76) Inventor: Joseph J. Berke, 3248 Interlaken, West Bloomfield, MI (US) 48323

( * ) Notice: Subject to any disclaimer, the term of this patent is extended or adjusted under 35 U.S.C. 154(b) by 355 days.

(21) Appl. No.: 10/877,178

(22) Filed: Jun. 28, 2004

(51) Int. Cl.
   B60R 21/00 (2006.01)
   B60R 22/00 (2006.01)

(52) U.S. Cl. .................. 280/801.1; 297/482; 297/488

(58) Field of Classification Search ............ 280/801.1; 297/482, 468, 470, 471, 472
   See application file for complete search history.

(56) References Cited

U.S. PATENT DOCUMENTS

| | | | | |
|---|---|---|---|---|
| 2,480,915 | A * | 9/1949 | George .................. | 297/474 |
| 4,741,574 | A * | 5/1988 | Weightman et al. ...... | 297/482 |
| 5,005,865 | A * | 4/1991 | Kruse .................... | 280/801.1 |
| 5,161,824 | A * | 11/1992 | Li .......................... | 280/808 |
| 5,213,366 | A * | 5/1993 | Sweger, Jr. ............ | 280/808 |
| D338,552 | S * | 8/1993 | Carrico et al. .......... | D2/639 |
| 5,322,349 | A * | 6/1994 | Gianino .................. | 297/482 |
| 5,466,003 | A * | 11/1995 | Tanaka et al. .......... | 280/733 |
| D369,671 | S * | 5/1996 | Gordon .................. | D2/639 |
| 5,584,536 | A * | 12/1996 | White .................... | 297/482 |
| D387,187 | S * | 12/1997 | Connor et al. .......... | D2/639 |
| 5,795,030 | A * | 8/1998 | Becker .................. | 297/488 |
| 6,017,094 | A * | 1/2000 | Syiek .................... | 297/482 |
| 6,235,391 | B1 * | 5/2001 | Contreras et al. ....... | 428/367 |
| 6,273,467 | B1 | 8/2001 | Berke et al. | |
| 6,322,150 | B1 * | 11/2001 | Harper et al. .......... | 297/482 |
| D517,946 | S * | 3/2006 | Berke et al. ............ | D11/200 |
| D518,412 | S * | 4/2006 | Berke et al. ............ | D11/200 |
| D518,756 | S * | 4/2006 | Berke et al. ............ | D11/200 |
| D519,403 | S * | 4/2006 | Berke et al. ............ | D11/200 |
| D519,404 | S * | 4/2006 | Berke et al. ............ | D11/200 |
| D519,405 | S * | 4/2006 | Berke et al. ............ | D11/200 |
| 7,121,628 | B2 * | 10/2006 | Lo ........................ | 297/482 |
| 2003/0052528 | A1 * | 3/2003 | Huggins ................ | 297/482 |

* cited by examiner

*Primary Examiner*—Christopher P. Ellis
*Assistant Examiner*—Joseph Rocca
(74) *Attorney, Agent, or Firm*—Alex Rhodes

(57) ABSTRACT

A soft resilient comfort cushion and method for promoting the use of a safety belt by a pregnant woman, said comfort cushion comprising: a resilient soft elongated cushion having tapered end portions, a length which is sufficient to span a groin region of said pregnant woman below a fetal abdominal bulge, a width which is near or about the width of said safety belt and a thickness which is sufficient to prevent discomfort to a pregnant woman by preventing the pressure and rubbing of the safety belt on the groin and lower abdominal regions of the pregnant woman. In a first embodiment of the invention, the soft resilient cushion has a cellular polymer core, a cover for enclosing the core and a pair of straps for attaching the comfort cushion to a restraint system belt. In a second embodiment, the comfort cushion is an inflatable cushion with a pair of straps for attaching the comfort cushion to a restraint system belt. In a third embodiment, the comfort cushion is an integral part of a restraint system belt.

12 Claims, 4 Drawing Sheets

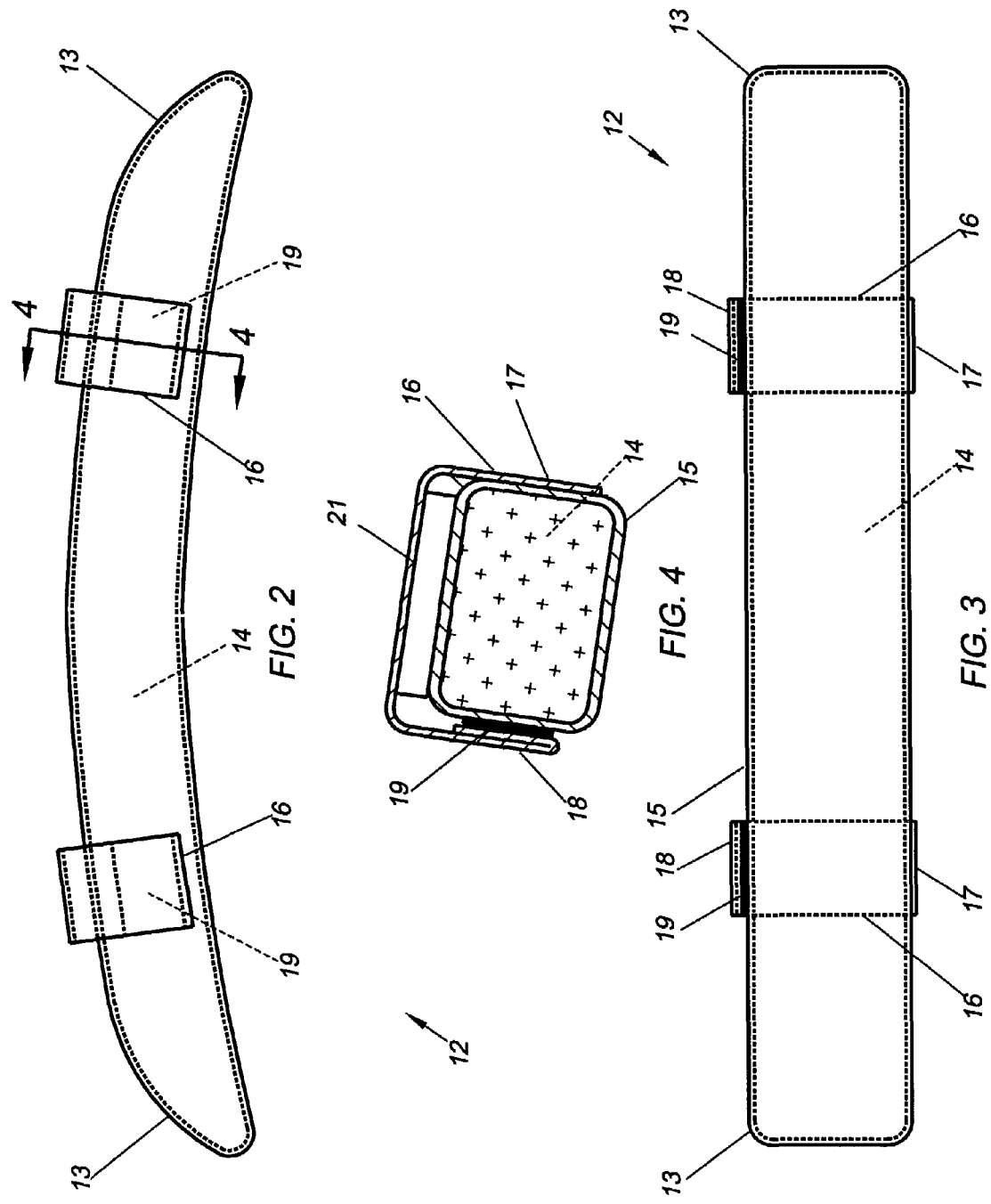

LAP BELT COMFORT CUSHION

FIELD OF THE INVENTION

This invention relates to safety belt mounted pads and more particularly to a soft resilient comfort cushion for promoting the use of restraint system belts for pregnant women.

BACKGROUND OF THE INVENTION

Despite the warnings of serious consequences (injuries and fatalities) and mandatory legislation, many pregnant women continue to avoid the use of seat belts. Others impair the function of a belt by providing excessive slack. Pregnant women are adverse to wearing seat belts because of a fear of injuring their fetuses and the rubbing of a belt against a tender abdomen. A failure to "buckle up" can result in an ejection from a vehicle or an impact of an unrestrained occupant with a vehicle interior. Moreover, air bags are intended to work with belts. A failure to "buckle up" can render an air bag ineffective. It may also result in sanctions such as monetary fines from violations of vehicle laws. There is no evidence that a restraint system belt increases the risk of injury to a pregnant woman or her fetus.

A University of Michigan accident study found that unrestrained or improperly restrained pregnant women are 5.7 times more likely to have an adverse fetal outcome than properly restrained pregnant women. In a 1990 to 1999 study conducted in Massachusetts, one-quarter of the pregnancy associated mortality rate was due to vehicle collisions. In a study of pregnant women in 1980 through 1988, motor vehicle collisions by the Harborview Injury Prevention and Research Center of Seattle, Wash., unrestrained pregnant women were 1.9 more likely to have low birth weight babies and 2.3 times more likely to give birth within 48 hours after motor vehicle crashes.

In a 2003 report in the Journal of Obstetrics and Gynecology, unbelted pregnant women were nearly three times more likely to lose fetuses and twice as likely to have excessive maternal bleeding than pregnant women wearing seat belts. Similar results were obtained in a study of pregnant women in vehicle accidents in Utah, reported in the Mar. 1, 2004 Journal of the American Family Physician. In 2002, there were U.S. Pat. No. 4,019,280 births in the United States, down slightly from 2002 (U.S. Pat. No. 4,025,933). Assuming that the majority of the women giving birth were drivers, it is safe to say that large numbers of pregnant women were at risk because of a failure to "buckle up" or improper use (excessive slack) of safety belts.

In a vehicle accident, properly worn safety belts can prevent a pregnant woman from impacting a steering wheel, a windshield or instrument panel. It will also allow her to benefit from the deceleration forces of a collapsing vehicle.

In my U.S. Pat. No. 6,273,467, a restraint system shield for pregnant women is disclosed consisting of soft resilient pads attached to lap and shoulder belts. The object of these pads is to prevent the rubbing of restraint system belts on sensitive body areas, such as the abdomens of pregnant women. The soft resilient cushions of my U.S. patent could be important in reducing pregnancy related vehicle injuries and fatalities by persuading pregnant women to "buckle up".

SUMMARY OF THE INVENTION

This invention is an improvement of my invention disclosed in U.S. Pat. No. 6,273,467, incorporated herein by reference. It is a primary object of the present invention to promote the use of safety belts by pregnant women by providing comfort with safety belts. The invention broadly consists of an elongated resilient cushion which is adapted to span the groin region of a pregnant woman below the fetal abdominal bulge and a means for retaining the cushion to a safety lap belt.

In a first embodiment of the invention, the soft resilient comfort cushion is comprised of a resilient fibrous or cellular polymer core enclosed in a thin cover, a pair of straps for attaching the cushion to a lap/shoulder belt and a fastener means for retaining the straps to the belt. In a second embodiment, the soft resilient comfort cushion is an inflatable cushion which is attached to a lap/shoulder belt with a means for attaching the inflatable cushion. In a third embodiment, the soft resilient comfort cushion is integral with a safety belt.

Although my invention is directed to pregnant women, it is obvious that it can be used to improve the comfort of other vehicle occupants. In employing the teaching of the present invention, a plurality of alternate constructions can be provided to achieve the desired results and capabilities. In this disclosure, some alternate constructions are discussed. However, these embodiments are intended as examples, and should not be considered as limiting the scope of my invention.

Further objects, benefits and characterizing features of the invention will become apparent from the ensuing detailed description and drawings which illustrate and describe the invention. The best mode which is contemplated in practicing the invention together with the manner of using the invention are disclosed and the property in which exclusive rights are claimed is set forth in each of a series of numbered claims at the conclusion of the detailed description.

BRIEF DESCRIPTION OF THE DRAWINGS

The invention will be better understood and further objects, characterizing features, details and advantages thereof will appear more clearly with reference to the diagrammatic drawings illustrating a presently preferred specific embodiment of the invention by way of non-limiting example only.

FIG. 2 is a top view of a first embodiment of a safety lap/shoulder belt and comfort cushion according to the present invention.

FIG. 3. is a front view of the safety lap/shoulder belt and comfort cushion.

FIG. 4 is a cross-sectional view taken on the line 4-4 in FIG. 2.

DETAILED DESCRIPTION OF A PREFERRED EMBODIMENT

Figure 1:
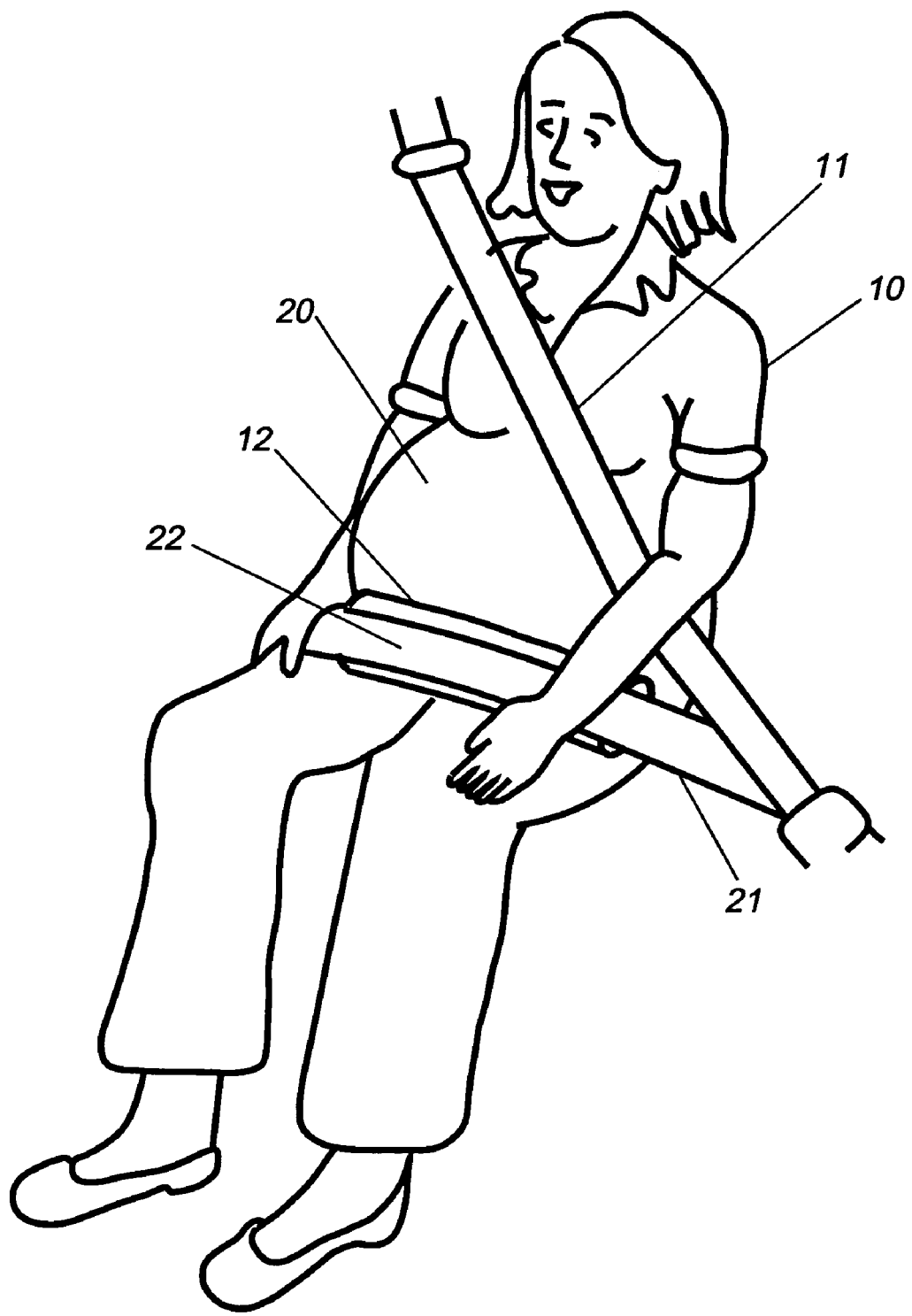
FIG. 1 is a perspective view of a pregnant woman with a lap/shoulder belt restraint system according to the present invention.

Referring now to the drawings wherein like numerals designate like and corresponding parts throughout the several views, in FIG. 1 a pregnant woman 10 is shown with a vehicle lap/shoulder belt 11 and a soft resilient comfort cushion 12 according to the present invention. The comfort cushion 12 is an elongated cushion which is adapted to span a groin region 22 of the pregnant woman 10 below a fetal abdominal bulge 20. The comfort cushion 12 is positioned between a safety lap belt portion 21 of the lap/shoulder belt 11 and the groin region 22 of the pregnant woman 10. One feature of the comfort cushion 12 is that it can be used with existing safety belts. Another benefit is that it is a relatively low cost means for encouraging pregnant women to use safety belts.

With reference to FIGS. 2 through 4, the comfort cushion 12 has an arcuate shape with tapered end portions 13 to conform to the shape of the groin 22 and the lap belt portion 21 of the lap/shoulder belt 11 as it wraps around the groin 22. The length of the comfort cushion 12 is sufficient to space the lap belt portion 21, and particularly the upper and lower edges of the lap belt portion 21 away from the sensitive groin 22. The width of the comfort cushion 12 is preferably about the same or slightly greater than the width of the lap belt portion 21. The thickness of the cushion 12 is not critical and is preferably within a range of less than two inches and greater than ¾ inches.

The comfort cushion 12 is comprised of a soft resilient cellular core 14, an optional thin flexible outer cover 15, enclosing the core 14, and a pair of thin narrow spaced straps 16 for attaching the comfort cushion 12 to the lap belt portion 21. An integral decorative cover can be provided, in lieu of the separate outer cover 15, by a usual process such as "slush molding". One end portion 17 of each of the straps 16 is fixed to the outer cover 15 and an opposite distal end portion 18 has a half portion of a hook and loon fastener 19 for securing the comfort cushion 12 to the lap belt portion 21. An opposite half portion 18 of the hook and loop fastener 19 is fixed to the cover 15 by a usual means such as sewing, heat bonding or an adhesive.

The comfort cushion 12 is used in the following manner. The first step is to insure that the pregnant woman 10 is properly positioned in a seat with the lap belt portion 21 of the safety belt 11 contacting the 22 groin below the abdominal fetal bulge 20. The lap belt portion 21 is then grasped and moved forwardly away from the groin 22 by an amount which is sufficient to place the comfort cushion 12 between the lap belt portion 21 and the groin 22 with the mounting straps 16 extending below the lap belt portion 21. The lap belt portion 21 is then released to allow the lap belt portion 21 and comfort cushion 12 to rest against the groin 22. The mounting straps 16 are then passed over the outer surface of the lap belt portion 21 and the distal end portions 18 of the mounting straps 16 are joined to the outer cover 15 of the comfort cushion 12 by uniting the half portions of the hook and loop fastener 19. As a final step, the position of the comfort cushion 12 is adjusted, if necessary, to rest the comfort cushion 12 against the groin 22 rather than the fetal abdominal bulge 20.

Figure 5:
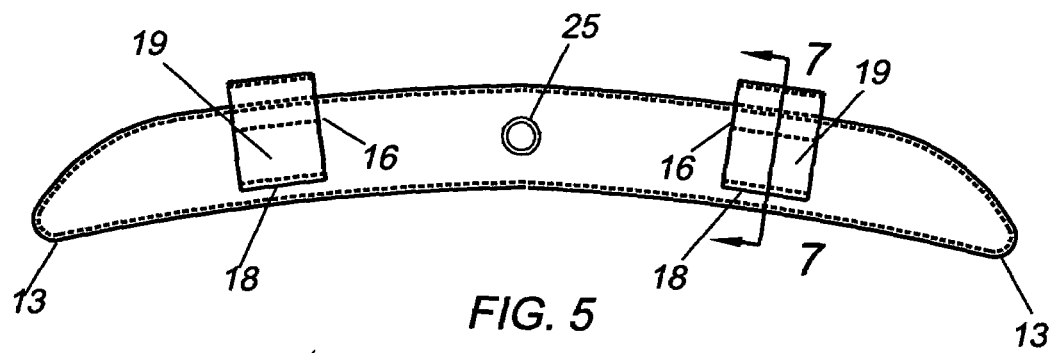
FIG. 5 is a top view of a second lap/shoulder belt embodiment of my invention.
Figure 7:
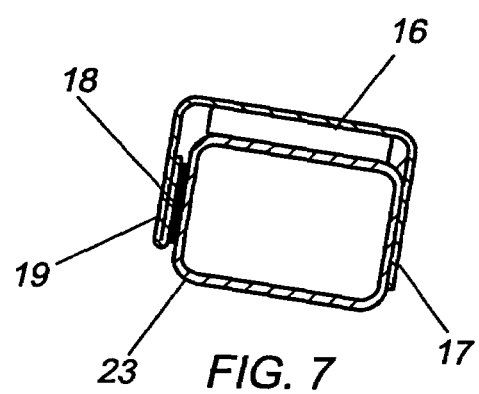
FIG. 7 is a cross-sectional view taken on the line 7-7 in FIG. 5.
Figure 6:
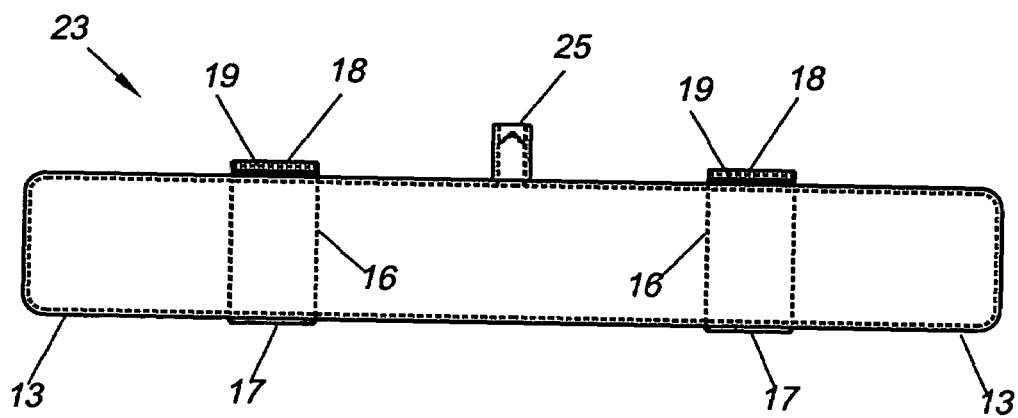
FIG. 6. is a front view of the second lap/shoulder belt embodiment.
Figure 8:
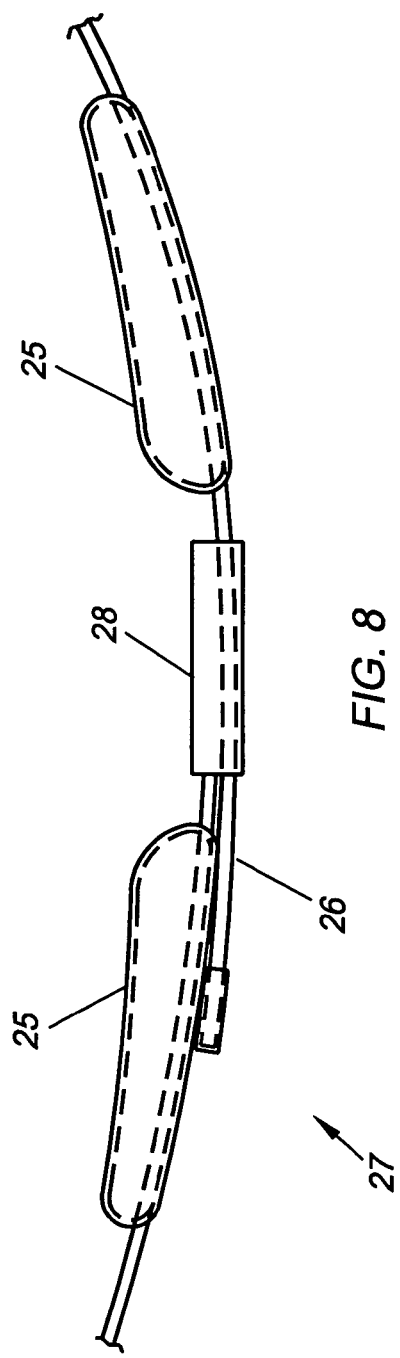
FIG. 8 is a plan view of a lap belt only and a pair of comfort cushions according to the present invention.
Figure 9:
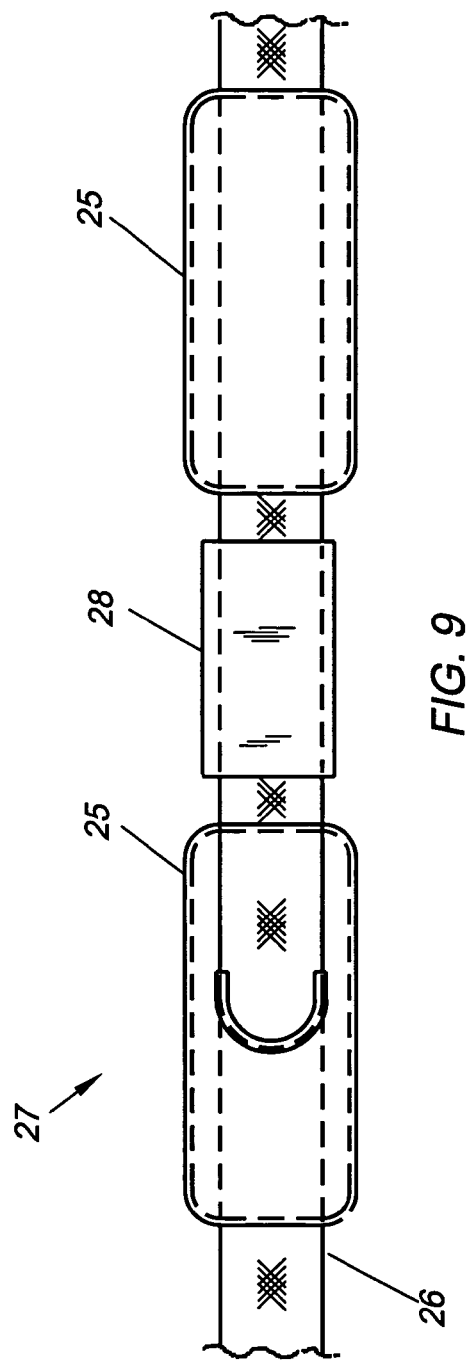
FIG. 9 is a front view of the lap belt and pair of comfort cushions.

Referring now to FIGS. 5 through 7, an alternate embodiment 23 is shown having a shape which is similar to the first embodiment 12 which is comprised of an inflatable cushion 24 and a pair of mounting straps 16. On a top portion of the cushion 24 is a valve 25 for inflating the cushion 24. In FIGS. 8 and 9, a third embodiment 27 is shown wherein a pair of comfort cushions 25 are molded integral with a separate lap belt 26, it being understood that a single integral comfort cushion (not shown) can be provided on the lap belt 26 or the lap belt portion 21 of a lap/shoulder belt 11. The comfort cushions 25 are adjacent to opposite sides of a buckle 28. One benefit of this embodiment 27 is that the comfort cushions 25 are always available. A second advantage is that it eliminates the requirement of installing comfort cushions, thereby simplifying the manner of using the invention.

From the above it is apparent that my invention provides a solution to the problem of the avoidance by pregnant women of vehicle safety belts. Although only several embodiments of my invention have been illustrated and described, it will be appreciated that after having the benefit of my disclosure, other embodiments can be derived by persons skilled in the art by such changes as material substitutions, changes in shape and substitutions of parts without departing from the spirit thereof.

What I claim is:

1. In combination with a safety lap belt for restraining a pregnant woman in a vehicle, a resilient elongated comfort cushion for promoting the use of said safety belt by preventing discomforting pressure and rubbing of said lap belt on the groin and lower abdominal regions of said woman by positioning said comfort cushion on said groin between said seat belt and said groin and said lower abdominal regions of said woman comprising: a narrow, resilient elongated cushion having a cross-section that varies from a uniform rectangular cross-section to tapered end portions, a length which is sufficient to span said groin region of said pregnant woman below a fetal abdominal bulge, a width which is near or about the width of said safety belt and a thickness which is sufficient to prevent discomfort to said pregnant woman by preventing said discomforting pressure and rubbing of said safety belt on said groin and said lower abdominal regions of said pregnant woman; a thin flexible cover for enclosing said cushion, said cover having a pair of half portions of spaced apart members of hook and loop fasteners on an upper surface of said cover; and a pair of narrow spaced apart one-piece cross-straps, said cross-straps in perpendicular relationship to an extent of said cushion for attaching and positioning said comfort cushion on said safety lap belt between said safety belt and said groin and said lower abdominal regions of said woman, each of said cross-straps having an end portion attached to a lower surface of said cover and an opposite free end portion with a half portion of a hook and loop fastener for engaging a half portion of said hook and loop fastener on a surface of said cover.

2. The combination recited in claim 1 wherein said comfort cushion is a soft resilient cushion.

3. The combination recited in claim 2 further comprising a thin flexible decorative outer cover which is an integral portion of said cellular polymer cushion.

4. The comfort cushion recited in claim 2 wherein said soft resilient comfort cushion is comprised of a pair of comfort cushions which are integral with said safety belt.

5. The combination recited in claim 1 wherein said cover is a removable flexible thin decorative outer cover for enclosing said cellular cushion.

6. The combination recited in claim 1 wherein said safety belt is a lap belt portion of a lap/shoulder belt.

7. The combination recited in claim 1 wherein said safety belt is a separate lap belt.

8. The combination recited in claim 1 wherein said soft resilient cushion for preventing said discomforting pressure and rubbing of said safety belt on said groin and said lower abdominal regions of said pregnant woman is an inflatable cushion.

9. The comfort cushion recited in claim 1 wherein said soft resilient comfort cushion is comprised of a single comfort cushion which is integral with said safety belt.

10. A method for promoting the use of a safety belt by a pregnant woman in a vehicle comprising the steps of: insuring that a pregnant woman is properly positioned in a seat of a vehicle with a safety belt contacting and straddling her groin below an abdominal fetal bulge; grasping a mid portion of said safety belt which straddles said groin portion of said pregnant woman; moving said safety belt forwardly away from said groin portion by an amount which is sufficient to install at least one elongated narrow soft resilient comfort cushion between said safety belt and said groin portion for preventing discomforting pressure and rubbing on said groin and lower abdominal portions of said woman, attaching said soft resilient comfort cushion to said seat belt with at least one narrow cross-strap extending below said safety belt with a perpendicular relationship to said elongated comfort cushion by encircling said safety belt with said cross-strap, attaching an end portion of said cross-strap a cover of said comfort cushion and releasing said safety belt to retain said comfort cushion between said groin and said lower abdominal portions and said safety belt.

11. The method recited in claim 10 further comprising the steps of encircling said seat belt and comfort cushion with a second cross-strap; and connecting an end portion of said second cross-strap to said cover of comfort cushion to further retain said comfort cushion between said groin and lower abdominal portions and said safety belt.

12. A method for promoting the use of a safety belt by a pregnant woman in a vehicle comprising the steps of: inflating a soft resilient comfort cushion having a length which is sufficient to span a groin region of said pregnant woman below a fetal abdominal bulge, said cushion having a width which is near or about the width of said safety belt and a thickness which is sufficient to prevent discomfort to said pregnant woman by eliminating the discomforting pressure and rubbing of said safety belt on said groin and lower abdominal regions of said pregnant woman; insuring that said pregnant woman is properly positioned in a seat of said vehicle with said safety belt contacting and straddling her groin below an abdominal fetal bulge; grasping a mid portion of said safety belt which straddles said groin portion of said pregnant woman; moving said safety belt forwardly away from said groin portion by an amount which is sufficient to install said soft resilient comfort cushion between said safety belt and said groin portion with a pair of narrow cross-straps extending below said safety belt; inserting said soft resilient comfort cushion between said groin portion and said lower abdominal regions and said safety belt; releasing said safety belt to allow said comfort cushion safety belt to contact said groin portion; encircling said safety belt with said cross-straps by passing end portions of said cross-straps over an outer surface of said safety belt; and connecting said end portions of said cross-straps to said comfort cushion to retain said comfort cushion between said groin and said lower abdominal regions and said safety belt.

* * * * *